US009479908B2

(12) United States Patent
Midkiff

(10) Patent No.: US 9,479,908 B2
(45) Date of Patent: Oct. 25, 2016

(54) SHORT MESSAGE SERVICE PROTOCOL GATEWAY

(71) Applicant: AT&T Mobility II LLC, Atlanta, GA (US)

(72) Inventor: David Midkiff, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/566,764

(22) Filed: Dec. 11, 2014

(65) Prior Publication Data

US 2015/0140961 A1    May 21, 2015

Related U.S. Application Data

(63) Continuation of application No. 13/296,330, filed on Nov. 15, 2011, now Pat. No. 8,923,900, which is a continuation of application No. 11/467,335, filed on Aug. 25, 2006, now Pat. No. 8,068,860.

(51) Int. Cl.

| H04W 4/14 | (2009.01) |
| H04W 4/18 | (2009.01) |
| H04W 80/08 | (2009.01) |
| H04W 88/16 | (2009.01) |
| H04M 15/00 | (2006.01) |

(52) U.S. Cl.
CPC .......... *H04W 4/14* (2013.01); *H04M 15/8221* (2013.01); *H04W 4/18* (2013.01); *H04W 80/085* (2013.01); *H04W 88/16* (2013.01)

(58) Field of Classification Search
USPC ........................................................ 455/466
See application file for complete search history.

(56) References Cited

U.S. PATENT DOCUMENTS

| 6,516,194 | B2 | 2/2003 | Hanson |
| 6,560,456 | B1 | 5/2003 | Lohtia et al. |
| 6,839,562 | B2 | 1/2005 | Smith et al. |
| 6,885,872 | B2 | 4/2005 | McCann et al. |
| 7,120,455 | B1 | 10/2006 | Chen et al. |
| 7,200,387 | B1 | 4/2007 | Ephraim et al. |
| 7,801,539 | B2 | 9/2010 | Murtagh et al. |
| 8,068,860 | B1 * | 11/2011 | Midkiff .......................... 455/466 |
| 8,260,330 | B2 * | 9/2012 | Salonen ................. H04W 4/14 |
| | | | 455/414.4 |
| 8,923,900 | B2 * | 12/2014 | Midkiff .......................... 455/466 |
| 2003/0104827 | A1 | 6/2003 | Moran et al. |
| 2003/0153302 | A1 | 8/2003 | Lewis et al. |
| 2004/0053629 | A1 | 3/2004 | Rueger et al. |

(Continued)

OTHER PUBLICATIONS

Short Message Peer to Peer Protocol Specification v.3.4; Issue 1.2 (Oct. 12, 1999).

(Continued)

*Primary Examiner* — Steven Kelley
(74) *Attorney, Agent, or Firm* — Hartman & Citrin LLC

(57) ABSTRACT

A system for communicating short message service messages from a SMS application to a wireless communication device. The system includes a protocol gateway for converting messages from a simple object access protocol (SOAP) to a short message peer-to-peer (SMPP) protocol. By using a SOAP protocol for a portion of communications between the SMS application and the wireless communication device, the system provides communications path in which SMS application is not required to maintain knowledge of the complex SMPP protocol. The system may also include a billing mechanism for charging subscribers for content received by the wireless communication device.

14 Claims, 9 Drawing Sheets

(56) References Cited

U.S. PATENT DOCUMENTS

| | | |
|---|---|---|
| 2004/0142707 A1 | 7/2004 | Midkiff et al. |
| 2004/0192340 A1 | 9/2004 | Brem et al. |
| 2004/0259553 A1 | 12/2004 | Delaney et al. |
| 2005/0119017 A1 | 6/2005 | Lovell et al. |
| 2005/0220064 A1 | 10/2005 | Hundscheidt et al. |
| 2006/0111130 A1 | 5/2006 | Lee et al. |
| 2006/0135135 A1 | 6/2006 | Rybak |
| 2007/0249378 A1 | 10/2007 | Midkiff et al. |
| 2009/0176518 A1 | 7/2009 | Doni |

OTHER PUBLICATIONS

U.S. Office Action dated Apr. 27, 2009 in U.S. Appl. No. 11/467,335.
U.S. Office Action dated Sep. 29, 2009 in U.S. Appl. No. 11/467,335.
U.S. Office Action dated Jan. 12, 2011 in U.S. Appl. No. 11/467,335.
U.S. Notice of Allowance dated Jul. 21, 2011 in U.S. Appl. No. 11/467,335.
U.S. Office Action dated Jul. 19, 2012 in U.S. Appl. No. 13/296,330.
U.S. Office Action dated Jan. 4, 2013 in U.S. Appl. No. 13/296,330.
U.S. Office Action dated Nov. 22, 2013 in U.S. Appl. No. 13/296,330.
U.S. Office Action dated Apr. 10, 2014 in U.S. Appl. No. 13/296,330.
U.S. Advisory Action dated Jun. 23, 2014 in U.S. Appl. No. 13/296,330.
U.S. Notice of Allowance dated Aug. 19, 2014 in U.S. Appl. No. 13/296,330.
U.S. Notice of Allowance dated Oct. 6, 2014 in U.S. Appl. No. 13/296,330.

* cited by examiner

SHORT MESSAGE SERVICE PROTOCOL GATEWAY

CROSS REFERENCE TO RELATED APPLICATIONS

This application is a continuation of U.S. application Ser. No. 13/296,330, filed Nov. 15, 2011 (now U.S. Pat. No. 8,923,900), which is a continuation of U.S. application Ser. No. 11/467,335, filed Aug. 25, 2006 (now U.S. Pat. No. 8,068,860), the entireties of which are herein incorporated by reference.

FIELD OF THE INVENTION

The present invention generally relates to the field of telecommunications. More particularly, the invention relates to providing messaging services within a wireless network.

BACKGROUND

Mobile telephone messaging networks commonly provide short text messaging capabilities such as, for example, a standard Short Message Service (SMS) that supports transmission of alphanumeric messages between mobile telephone subscribers and other short message devices. Current standards provide for message lengths up to 140 bytes for single messages. For example, a short message (e.g., "Please remember to pick up the dry cleaning") may be sent from a first wireless phone to a second wireless phone and may appear on a display of the second wireless phone.

A number of protocols exist that can be used to transmit SMS messages. One such protocol is the Short Message Peer to Peer (SMPP) messaging protocol. This protocol was published as "Short Message Peer to Peer Protocol Specification" (version 3.4, Issue 1.2, Oct. 12, 1999) (available at http://www.smpp.org/). SMS messages may be routed between a mobile telephone messaging network and different SMS data applications via an SMPP gateway.

Current SMPP interfaces for SMS applications are robust; however, the SMPP protocol is not well known and requires specific knowledge of the underlying wireless network and its technology for successful implementation.

Therefore, there is a need for a system and method for providing a simplified interface for sending and receiving SMS messages by wireless subscribers using a SMS application.

SUMMARY OF THE INVENTION

The present invention, in one embodiment, includes a method of sending a message between a short message service application and a wireless communication device. The method can include sending an SMS service request from an SMS application to a gateway in one protocol, converting the SMS request in that protocol into another protocol, and sending the SMS request to a second gateway. From there the short message service request having the second protocol can be routed to a message center for delivery to the wireless communication device.

In some embodiments the first protocol can be a SOAP protocol, and the second protocol can be an SMPP protocol. A billing server can be used in the method to generate a billing record and bill a subscriber for SMS messages and content received by the subscriber. A bulk short message service request can be sent in some embodiments where the bulk short message service request includes common message content and a list of destination addresses. In some embodiments, the first gateway can generate separate send requests in the second protocol for each destination address in the bulk short message service request, with each separate send request including the common message content.

The invention further includes a system for sending a message between an SMS application and a communication device that comprises a short message service application, a protocol gateway, an SMPP gateway and a message center. The protocol gateway can convert a message from a first protocol to a second protocol. The SMPP gateway can receive the message in the second protocol from the protocol gateway. The message center can receive the message in the second protocol from the SMPP gateway and deliver the message to a communication device. The first protocol can be a SOAP protocol and the second protocol can be an SMPP protocol. The system can include a billing server configured to generate a billing record for billing a subscriber for SMS messages and content received by the subscriber.

In yet another embodiment, the invention comprises a protocol gateway for use in sending short messaging service messages. The protocol gateway can receive a message in a first protocol from a short message service application, convert the message to a second protocol, and send the message in the second protocol to a second gateway. The first protocol can be a SOAP protocol and the second protocol can be an SMPP protocol. The protocol gateway can send a purchase request to a billing server to charge for message content, and can process bulk short message service requests that include common message content and a list of destination addresses. The protocol gateway can generate separate send requests in the second protocol for each destination address. The protocol gateway can receive delivery responses for separate send requests, assemble the responses to generate a composite response, and forward the composite response to a short message service application.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
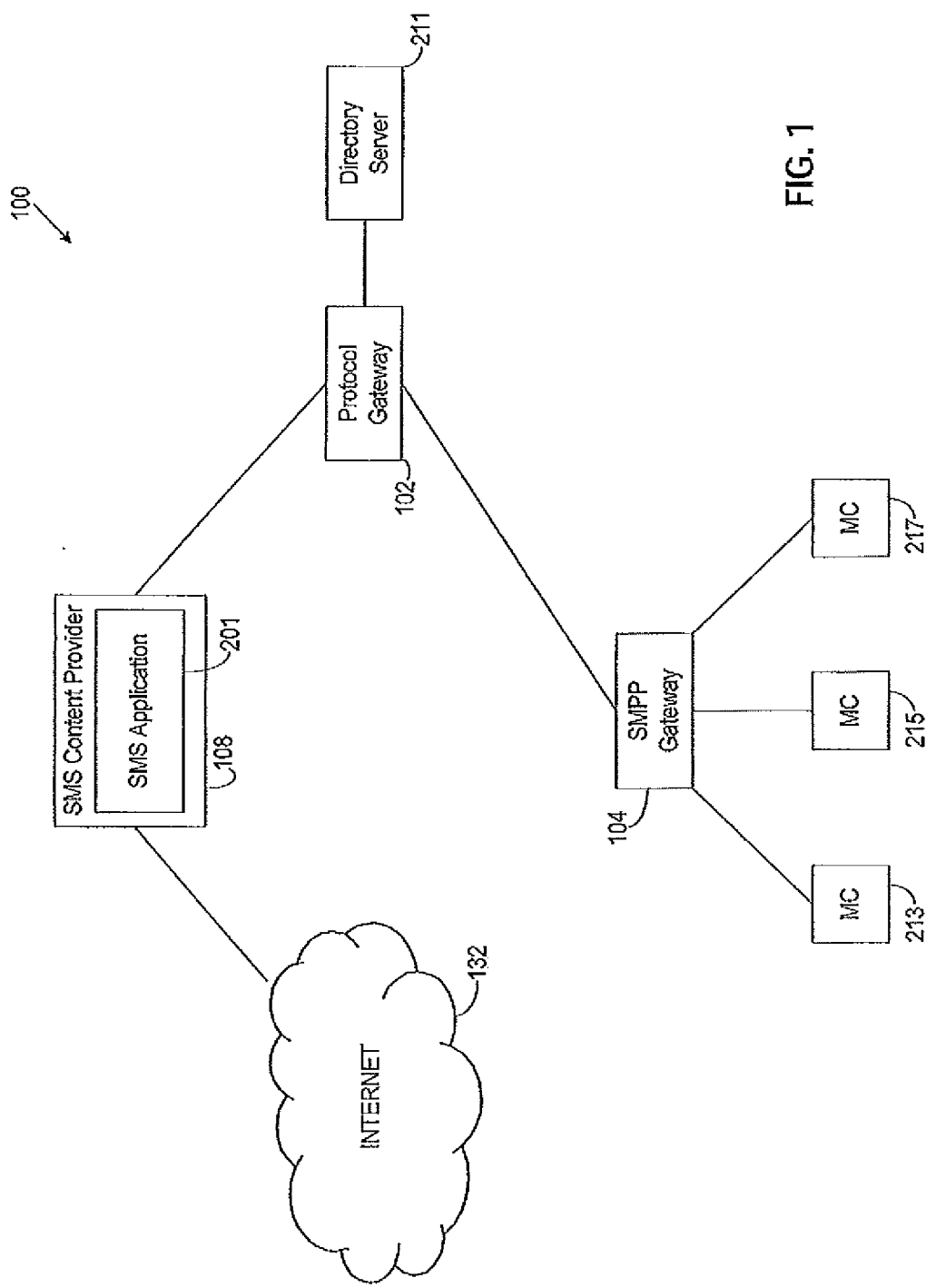
FIG. 1 is a block diagram illustrating a protocol gateway network architecture according to a first embodiment of the present invention.

FIG. 1 is a protocol gateway network architecture 100 in accordance with the first embodiment of the present invention. The protocol gateway network architecture 100 includes a protocol gateway 102, which can be used for conversion of messages that are in a, for example, simple object access protocol (SOAP) format to messages that are in short message peer-to-peer protocol (SMPP) format. Also included is a SMPP gateway 104, and an SMS content provider 108. The SMPP gateway 104 is connected to a number of message centers, 213, 215, and 217. The SMS content provider 108 can use SMS to send content directly to the device such as ringtones, news and stock alerts as is known in the art. The SMS content provider 108 can also send SMS messages that alert a device to perform an operation (for example, to download a ringtone, video, or e-mail). The SMS content provider 108 may have one or more SMS applications 201. Although shown in FIG. 1 as located between the internet 132 and the protocol gateway 102 of the wireless network, the SMS content provider 108 and SMS application 201 can be located on the internet 132 with the protocol gateway 102 being connected to the SMS content provider 108 through the internet 132. The configuration shown in FIG. 1, however, can provide additional security advantages over the alternate configuration.

The protocol gateway network architecture 100 may also include the Internet 132, an email client, and a directory server 211 which can include subscriber data and routing rules.

Figure 2:
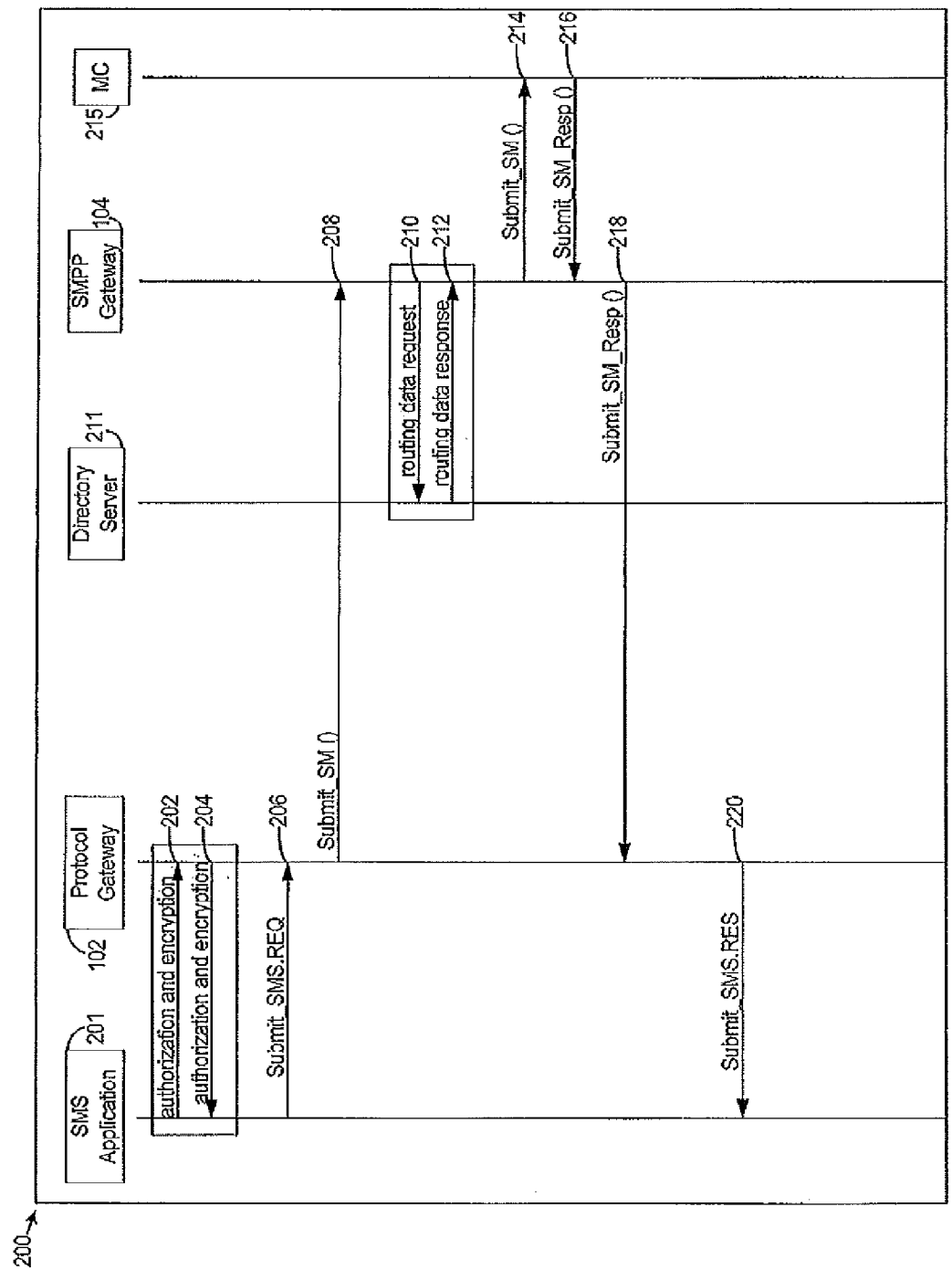
FIG. 2 is a diagram illustrating a method for sending a mobile terminated message using the first embodiment of the present invention.

FIG. 2 is a diagram 200 illustrating the transfer of a mobile terminated message from an SMS application 201 to the protocol gateway 102. At 202 and 204, the SMS application 201 and the protocol gateway 102 perform authorization and encryption handshaking in order to determine that the SMS application 201 is authorized to access the protocol gateway 102 and to prevent message data from being intercepted.

At 206, the SMS application 201 submits an SMS request, shown on the diagram as "Submit_SMS.REQ", to the protocol gateway 102. This request contains message information intended for a mobile station as well as information identifying the intended recipient, such as a mobile destination number (e.g., a telephone number associated with a mobile device). The request can also contain an address of the SMS application, such as an IP address or a domain name which resolves to the IP address. Data elements of such a request are later described in detail, but can contain the message to be sent and information identifying the intended recipient or identifying a device for which the message is intended. The request can be submitted in a SOAP format. The protocol gateway 102 receives the SOAP formatted SMS request and performs a conversion operation on the SOAP formatted message. This conversion maps the message information from the relatively simple ASCII XML-based SOAP format to the more complicated binary SMPP protocol.

At 208, the protocol gateway 102 forwards the request (now in an SMPP format) to the SMPP gateway 104. At 210, the SMPP gateway 104 queries a directory server 211 for routing information regarding where the SMPP gateway should forward the SMPP message based on the intended recipient of the message. The query can contain information regarding the intended recipient of the message. For example, the mobile number of a wireless device associated with the intended recipient can be included in the query. At 212, the directory server 211 returns a response to the SMPP gateway 104 based on the supplied information regarding the intended recipient of the message that indicates to which message center the message should be sent to provide for proper delivery of the message. Next at step 214, the SMPP gateway 104 forwards the message request to the message center 215 indicated in the response from the directory server.

Once the message has been received by the message center 215, the message center 215 submits a response message 216 to the SMPP gateway 104. The response message submission is labeled "Submit_SM_Resp( )" on the diagram. The response includes information identifying the SMS application 201 for which it is intended. This identifying information can be, for example, an IP address and port number of a server on which the SMS application is installed. It should be understood that this is not a verification that the message has been delivered to the intended recipient. SMS message centers operate as store and forward nodes. That is, messages sent to the message center 215 are stored in the message center 215 for later forwarding to the intended recipient. There is no guarantee that the intended recipient will receive the message. An SMS message center uses a "best effort" mode of operation. If the intended recipient is a mobile customer that, for example, does not register with the wireless network for a number of days, the message may never be delivered, and instead discarded.

The response 216 is received at the SMPP gateway 104. The SMPP gateway 104 forwards the response to the protocol gateway 102 at 218. A routing rule can exist at the SMPP gateway 104 to specify that for responses intended for the address of the SMS application 201, the response should be routed to the protocol gateway 102. The protocol gateway 102 performs a conversion operation on the SMPP formatted response to create a SOAP formatted response. At 222, the SOAP formatted response is sent to the SMS application 201.

The protocol gateway 102 can reject the mobile terminated message because of invalid content, protocols, or authorization errors. The SMPP gateway 104 can reject the mobile terminated message because the SMPP gateway 104 receives an invalid destination address (for example, an invalid mobile telephone number), or the destination address is not within wireless network (such information can be obtained from the directory server or a number resolution service to be discussed infra.) Also, the message center may reject a SMS message due to a permanent delivery failure.

Figure 3:
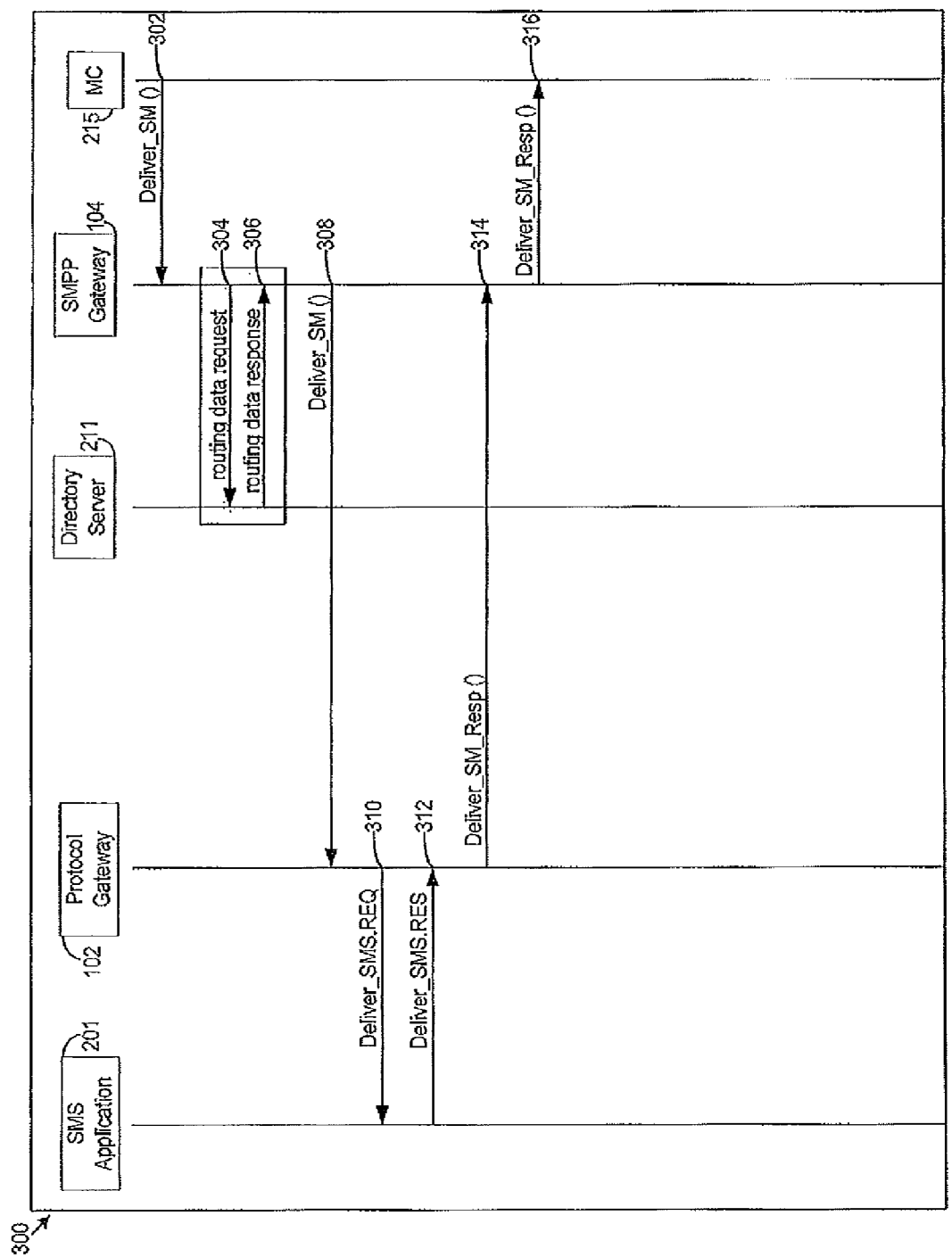
FIG. 3 is a diagram illustrating a method for receiving a mobile originated message by a SMS application.

FIG. 3 is a diagram 300 illustrating the transfer of a mobile originated message from a mobile station (not shown) to an SMS application 201. The message is sent from the mobile station, such as a wireless telephone, to its corresponding message center 215. The message can contain destination information for the message and be in an SMPP protocol format. At 302, the message center 215 sends a delivery request to the SMPP gateway 104 containing the message sent from the mobile device. At 304, the SMPP gateway 104 sends a routing data request to the directory server 211 to determine where the message should be routed based on the destination information. At 306, the directory server 211 issues a response to the SMPP gateway 104.

At 308, the SMPP gateway 104 sends a delivery request to the protocol gateway 102. The message can be in an SMPP format. The protocol gateway 102 can perform a conversion operation on the message, mapping the data contained in the SMPP format to data fields of a SOAP format. The protocol gateway 102 forwards the SOAP formatted message to the SMS application 201 at 310.

At 312, the SMS application 201 issues a delivery response to the protocol gateway 102. This response is labeled as "Deliver_SMS.RES" on the diagram. The protocol gateway 102 performs conversion operations on the SOAP formatted delivery response to create an SMPP formatted response. At 314, the SMPP formatted response is sent to the SMPP gateway 104. At 316, the SMPP formatted response is forwarded to the message center 215 that originated the message at 302.

Figure 4:
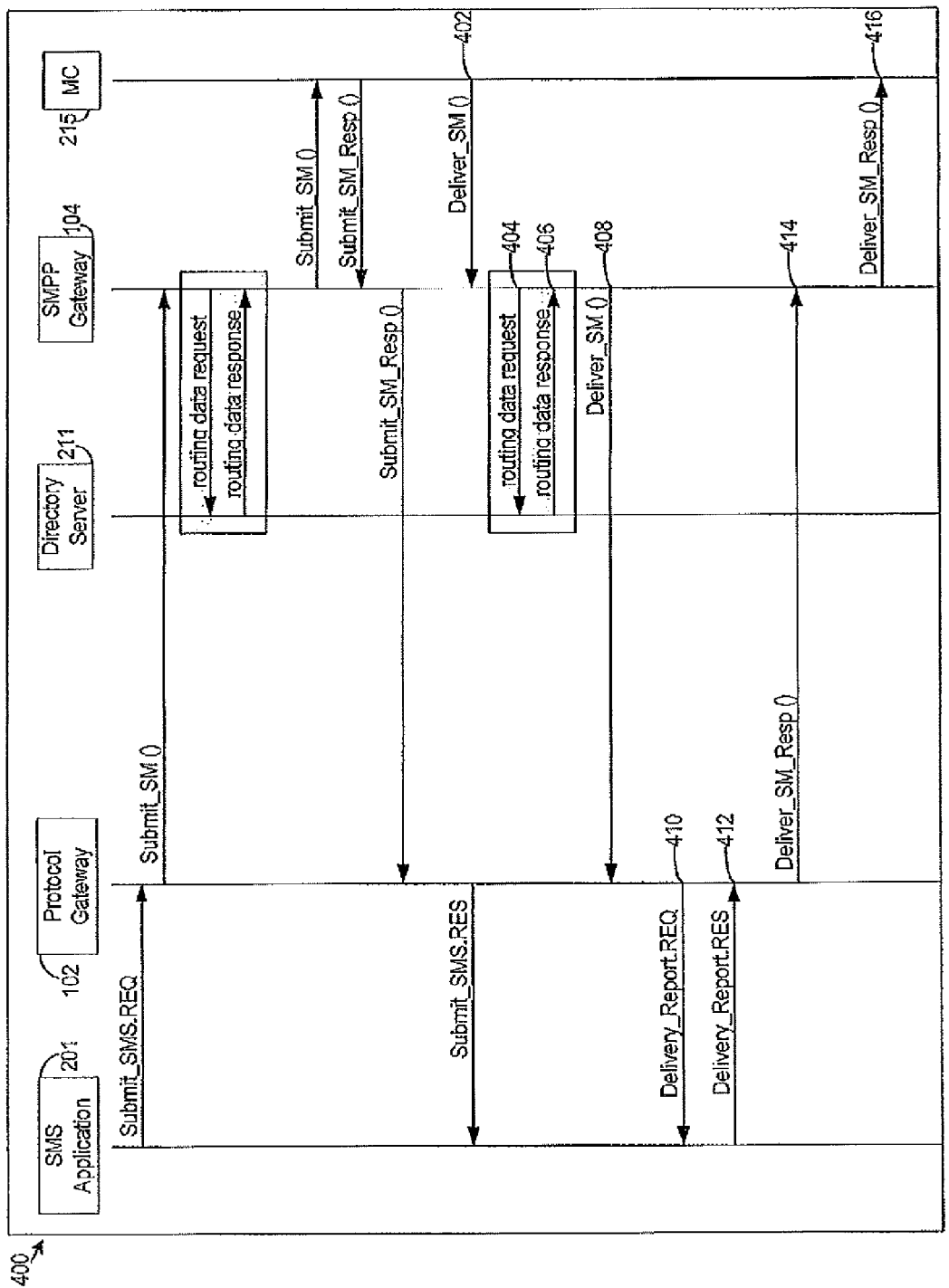
FIG. 4 is a diagram illustrating a method for sending a delivery report from a message center to an originating application via a protocol gateway.

FIG. 4 is a diagram 400 illustrating a process where a delivery report is requested for a submitted message request. The process is similar to that depicted in FIG. 2 for sending the message to the intended recipient and providing the response from the message center 215 that the message was received for delivery. In the case of FIG. 4, however, the submitted request ("Submit_SMS.REQ") includes a delivery notification flag (which is set to "1" or "yes") which is an indication that the SMS application 201 requests a delivery notification for the submitted message. As noted above, SMS message centers operate as store and forward nodes. After receiving the message, the message center will attempt to deliver the message to the intended recipient. If, as in the case shown in FIG. 4, the delivery notification flag is set, the message center 215 will initiate a delivery response to the SMS application upon successful delivery of the message to its intended recipient. The delivery response can be sent in all cases, whether the delivery attempt was successful or not. The delivery report can contain the final state of the message, delivered successfully, permanent error, message expired undelivered (for example, the mobile device could not be reached within a specific time, from hours to days).

Operation up to 402 is similar to that described above regarding FIG. 2 with the exception of a delivery notification flag being set in the initial request. At 402, the message center 215 sends an SMPP formatted delivery notification to the SMPP gateway 104. At 404, the SMPP gateway 104 requests routing information from the directory server 211. At 406, the directory server 211 returns information to the SMPP gateway 104 indicating the location of the protocol gateway 102. At 408, the SMPP gateway 104 uses the information provided by the directory server 211 to forward the delivery notification to the protocol gateway 102. The protocol gateway 102 receives the SMPP formatted delivery notification, and performs a conversion operation on the delivery notification to create a SOAP formatted delivery notification that is sent at 410 to the SMS application 201.

At 412, the SMS application 201 issues a delivery report response to the protocol gateway 102. The protocol gateway 102 receives the SOAP formatted delivery report response and performs a conversion operation on the SOAP formatted response to create an SMPP formatted response. The SMPP formatted response is forwarded to the SMPP gateway 104 at 414. At 416, the delivery response is forwarded to the message center 215.

It should be understood that the delivery report 402 sent from the message center 215 can be initiated by other events other than successful delivery of the message. For example, events such as a permanent error or message expiration at the message center 215 can also trigger the transmission of the delivery report.

Figure 5:
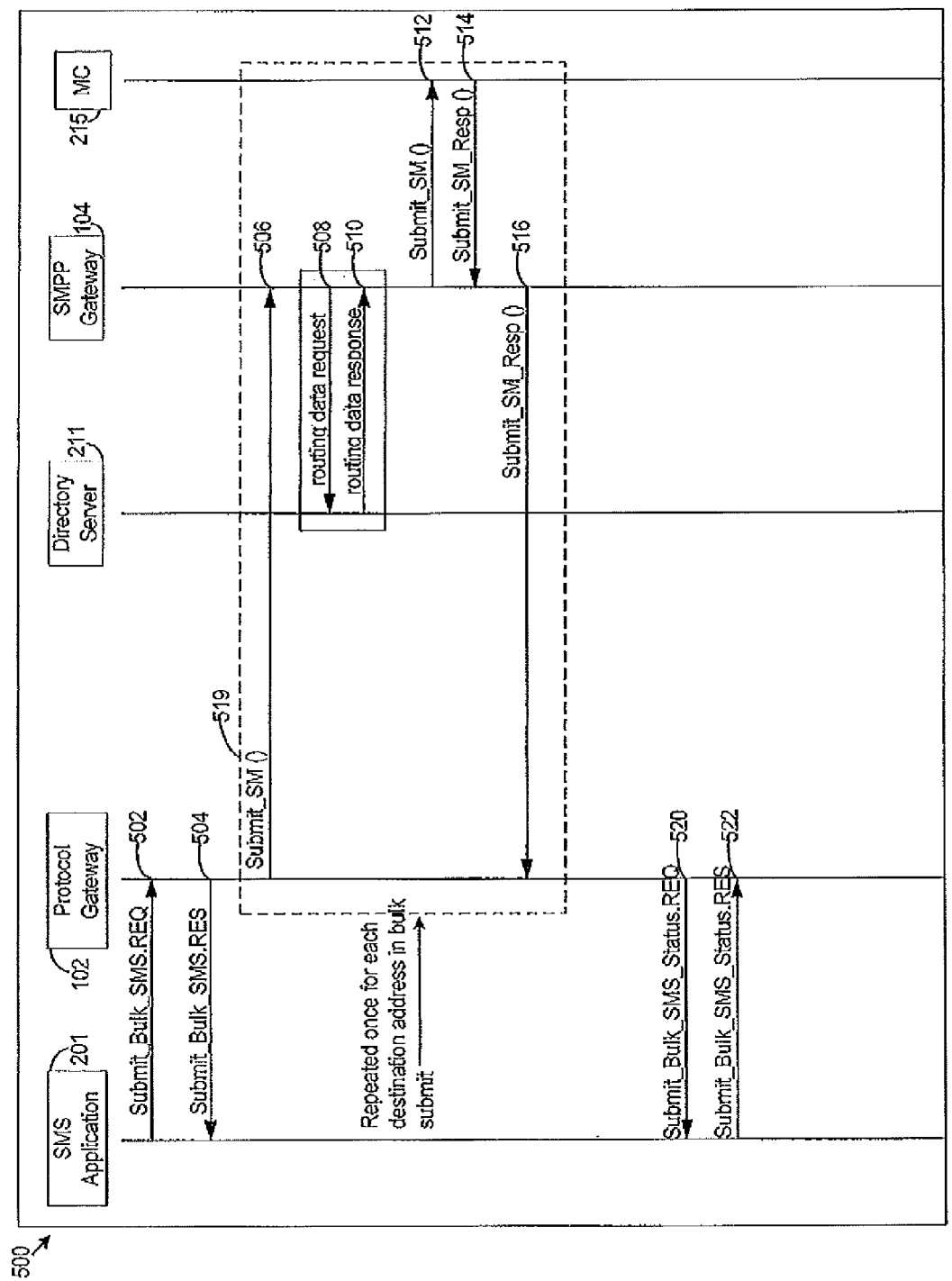
FIG. 5 is a diagram illustrating a method for sending a bulk message via the invented protocol gateway.

FIG. 5 is a diagram 500 illustrating a bulk send of a message by the SMS application 201 using the protocol gateway 102. At 502, a bulk send request which can be in a SOAP format is sent by the SMS application 201 to the protocol gateway 102. The bulk send request is labeled as "Submit_Bulk_SMS.REQ" in the diagram. The bulk send request contains message content that will be common to all recipients and a list of destination addresses to which to send the message content. The destination addresses can comprise a list of mobile telephone numbers to which the message is intended. The destination addresses can also comprise email addresses, or a combination of mobile telephone numbers and email addresses. At 504, a SOAP formatted bulk send response is sent back to the SMS application 201 by the protocol gateway 102. The protocol gateway 102 performs a conversion operation on the SOAP formatted bulk send request to create an SMPP formatted send request. A separate send request is created for each destination address contained in the SOAP bulk send request received from the SMS application 201. At 506, the protocol gateway 102 submits an SMPP formatted send request to the SMPP gateway 104 for one of the intended recipients. At 508, the SMPP gateway 104 sends a routing data request to the directory server 211. At 510, the directory server 211 returns a routing data response to the SMPP gateway 104 indicating which message center the SMPP gateway 104 should send the request to for delivery. At 512, the SMPP gateway 104 submits the send request to the message center 215 for delivery.

At 514, the message center 215 issues a response confirming that the message has been received at the message center 215. Again, this is not a confirmation that the message has been delivered; only that it has been received at the message center 215. The confirmation response is sent from the message center 215 to the SMPP gateway 104. The SMPP gateway 104 forwards this response to the protocol gateway 102 at 516. The protocol gateway 102 records that one of the bulk messages was received at the message center 215. The destination address of the original message can be used to identify to which of the messages from those submitted in the list that the confirmation message corresponds.

The actions 506, 508, 510, 512, 514, and 516, enclosed in dotted line 519 are repeated for each destination address in the bulk send request.

At 520, the protocol gateway 102 sends a SOAP formatted message to the SMS application 201 to confirm that the plurality of messages corresponding to the initial bulk status request were received by their respective message centers. This message can also indicate if there were failures of delivery to the message center(s) for one or more intended recipients and which recipients those were. At 522, the SMS application 201 sends a response to the protocol gateway 102 to indicate that the confirmation was received.

Thus, the protocol gateway 102 allows the SMS application 201 to submit a single message and a list of destination addresses for delivery to each address. The protocol gateway 102 collects responses for each message from their respective message centers (whether successful or unsuccessful) and assembles them into a response, which can be forwarded to the SMS application 201.

Figure 6:
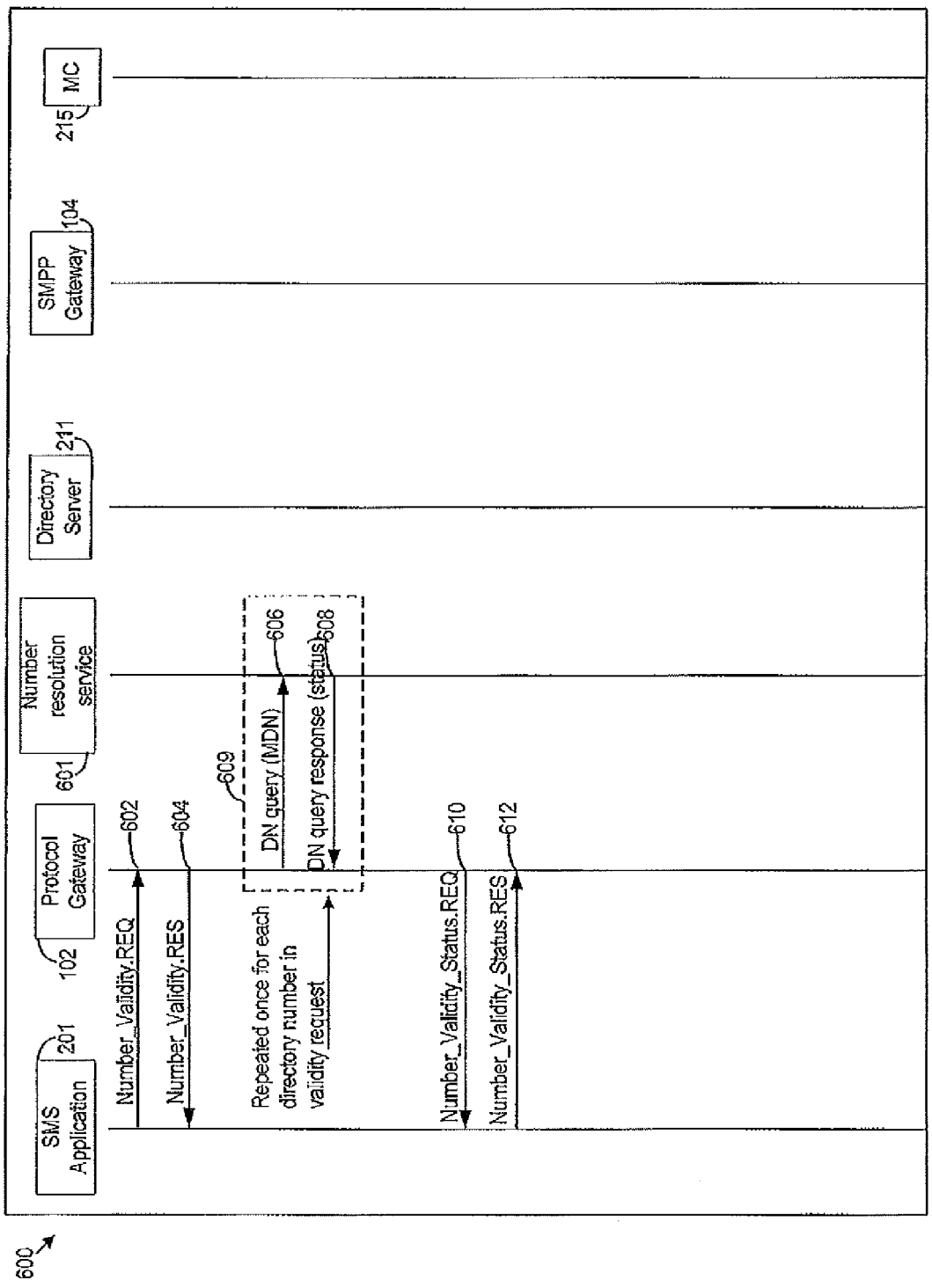
FIG. 6 is a diagram illustrating a method for verifying destination addresses within a network architecture utilizing a protocol gateway.

FIG. 6 is a diagram 600 illustrating a process for determining destination address validity using the protocol gateway 102. At 602, the SMS application 201 sends a validity request to the protocol gateway 102. The request can contain multiple destination addresses. At 604, the protocol gateway 102 returns a response to the validity request to the SMS application 201 to acknowledge receipt of the request. The protocol gateway 102 performs conversion operations on the SOAP formatted validity request to create one or more validity requests. At 606, the protocol gateway 102 sends a query to a number resolution service 601. The number resolution service 601 can comprise a number resolution server. At 608, the number resolution service 601 submits a response to the query back to the protocol gateway 102. The query at 606 and the response at 608 can use lightweight directory access protocol (LDAP). The actions at 606 and 608 contained in dotted line 609 are repeated for each of the destination addresses contained in the initial request from the SMS application 201.

The protocol gateway 102 assembles the response messages from the number resolution service 601 to create a SOAP formatted composite response message. At 610, the protocol gateway 102 sends the composite response message to the SMS application 201. At step 612, the SMS application 201 submits a response back to the protocol gateway 102 acknowledging that the response was received.

With the ability to check the validity of a destination address, the protocol gateway network architecture 100 provides a capability which allows the SMS application 201 to determine if a directory number is a valid number within a wireless network before the SMS application 201 sends messages to a communication device. The protocol gateway network architecture 100 also allows the protocol gateway 102 to query a number resolution service to determine if a directory number is assigned to a given wireless service.

Figure 7:
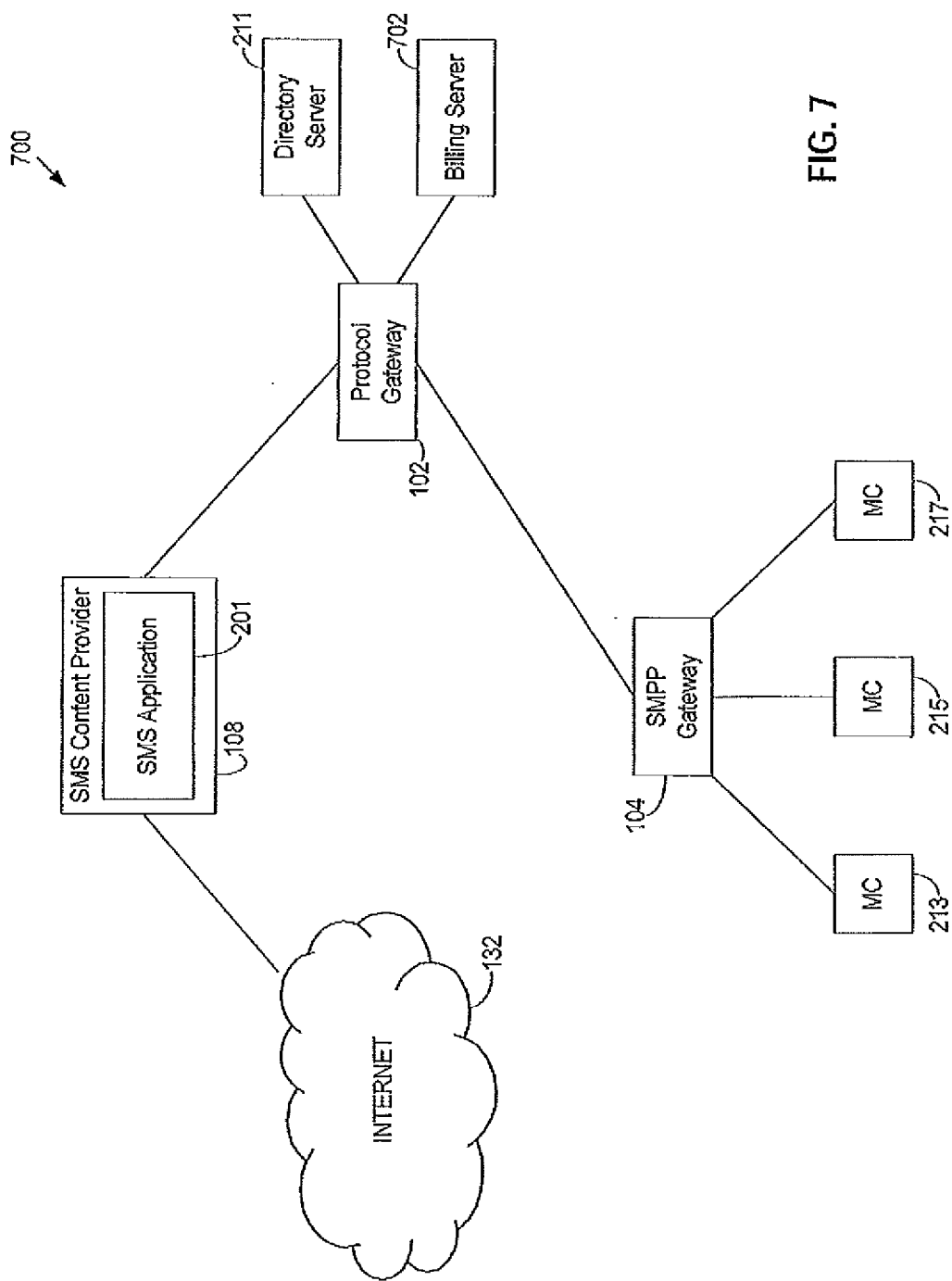
FIG. 7 is a block diagram illustrating a protocol gateway network architecture according to a second embodiment of the present invention.

FIG. 7 is a protocol gateway network architecture 700 in accordance with the second embodiment of the present invention. The protocol gateway network architecture 700 is similar to the protocol gateway network architecture 100 and additionally includes a billing server 702. The protocol gateway 102 can be connected to the billing server 702. By having an interface with the billing server 702, the protocol gateway network architecture 700 has the ability to charge for message content associated with a particular subscriber.

Figure 8:
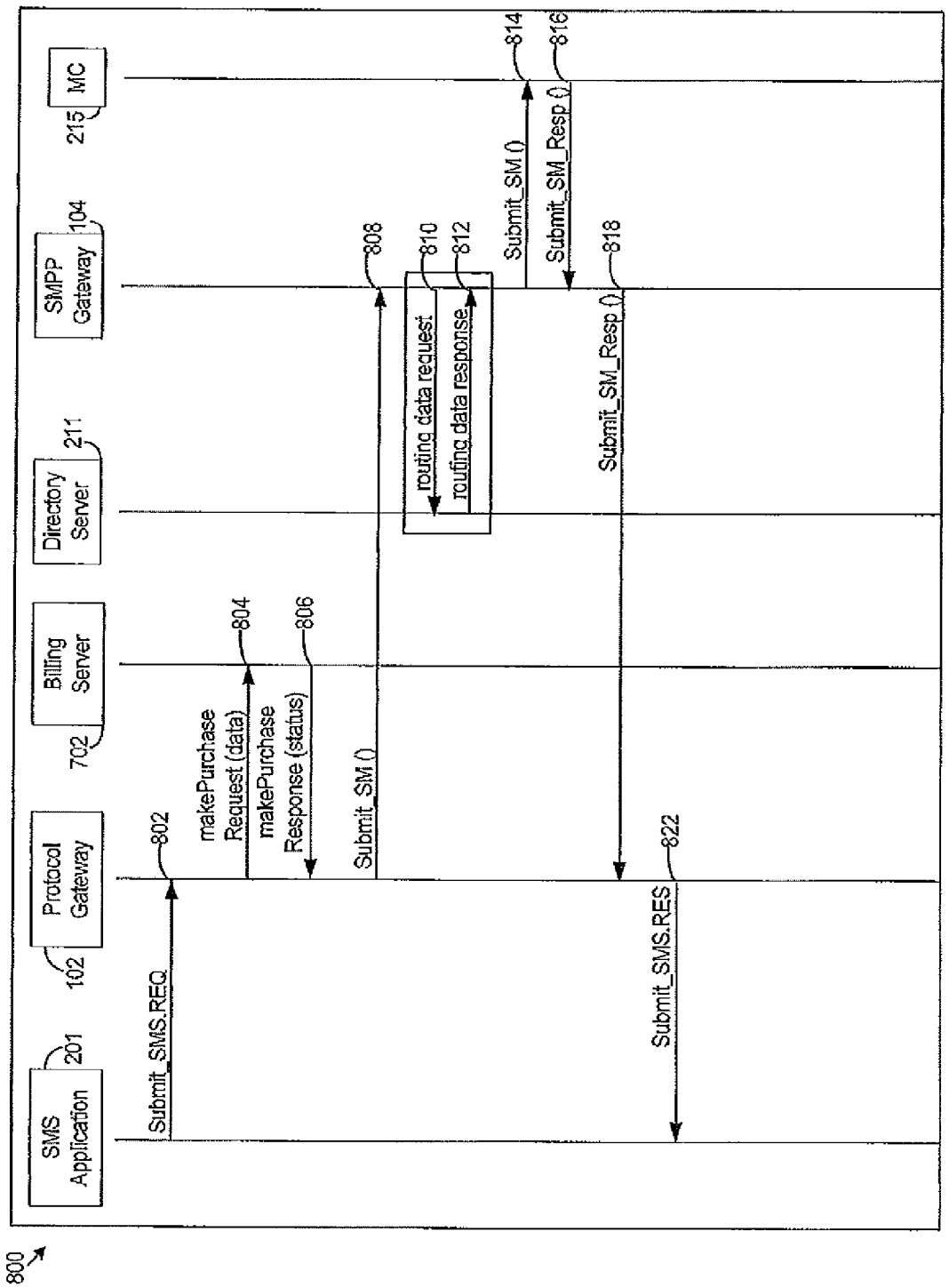
FIG. 8 is a diagram illustrating a method for providing a mobile terminated message within the second embodiment.

FIG. 8 is a diagram 800 illustrating the transfer of a mobile terminated message by an SMS application 201, which includes actions for creating a billing record. At 802, the SMS application 201 sends a message request to the protocol gateway 102. This message can be in a SOAP format. At 804, the protocol gateway 102 sends a purchase request to the billing server 702. This request can contain information identifying the mobile terminal and/or associated wireless account for which a message is intended. This identification can be, for example, a mobile telephone number. The billing server 702 records the information identifying the mobile terminal in a billing record. This billing record can also record additional information passed on to the billing server 702 from the protocol gateway 102 such as the amount of data contained in the message. Other information provided can include but is not limited to the type of the content of the message, and the price of the content. The amount charged to a wireless account can be based on the amount of data contained in the message. At 806, the billing server 702 issues a response to the purchase request to the protocol gateway 102 confirming receipt of the purchase request and creation of the billing record.

The protocol gateway 102 can perform a conversion operation on the SOAP formatted message submitted from the SMS application 201. The conversion operation can create a SMPP formatted message. At 808, the protocol gateway 102 submits the SMPP formatted message to SMPP gateway 104. At 810, the SMPP gateway 104 queries a directory server 211 for routing information regarding where the SMPP gateway 104 should forward the SMPP message based on the intended recipient of the message. At 812, the directory server 211 returns a response to the SMPP gateway 104 that indicates which message center the message should be sent in order for proper delivery of the message to the intended mobile station recipient. At 814, the SMPP gateway 104 forwards the message request to the message center 215 indicated in the response from the directory server 211.

Once the message has been received by the message center 215, the message center 215 submits a response message 816 to the SMPP gateway 104. The response message submission is labeled "Submit_SM_Resp( )" on the diagram. The response includes information identifying the SMS application 201 for which it is intended. This identifying information can be, for example, an IP address and port number of a server on which the SMS application 201 is installed. It should be understood that this is not a verification that the message has been delivered to the intended recipient. Message centers operate as store and forward nodes. That is, messages sent to the message center are stored in the message center for later forwarding to the intended recipient. There is no guarantee that the intended recipient will receive the message. A message center uses a "best effort" mode of operation. If the intended recipient is a mobile customer that, for example, does not register with the wireless network for a number of days, the message may never be delivered, and instead discarded.

The SMPP gateway 104 forwards the response to the protocol gateway 102 at 818. The protocol gateway 102 performs a conversion operation on the SMPP formatted response to create a SOAP formatted response. At 822, the SOAP formatted response is sent to the SMS application 201.

The billing server 702 can contain information regarding and/or have access to information regarding wireless subscriber accounts. Accessing this information can, for example, enable the billing server 702 to perform a check of the account status for the account associated with a mobile terminal for which a wireless message is intended. If no information for the intended recipient can be located, the billing server 702 can, for example, notify the protocol gateway 102 so that no message delivery attempt is made. The account status check could also show that the account is not in good standing. Message delivery may be denied in this case as well. In addition, the subscriber associated with the account may have indicated that she does not wish to be billed for messages so that no delivery attempt is made.

Where the account associated with the mobile terminal cannot be billed, the SMS application 201 receives an error message from the protocol gateway 102. Accordingly, a SMS message is not delivered to the message center or mobile terminal. A similar response can occur when the billing server 702 is unavailable for purchase request, or when a message is received by the protocol gateway 102 is invalid.

Figure 9:
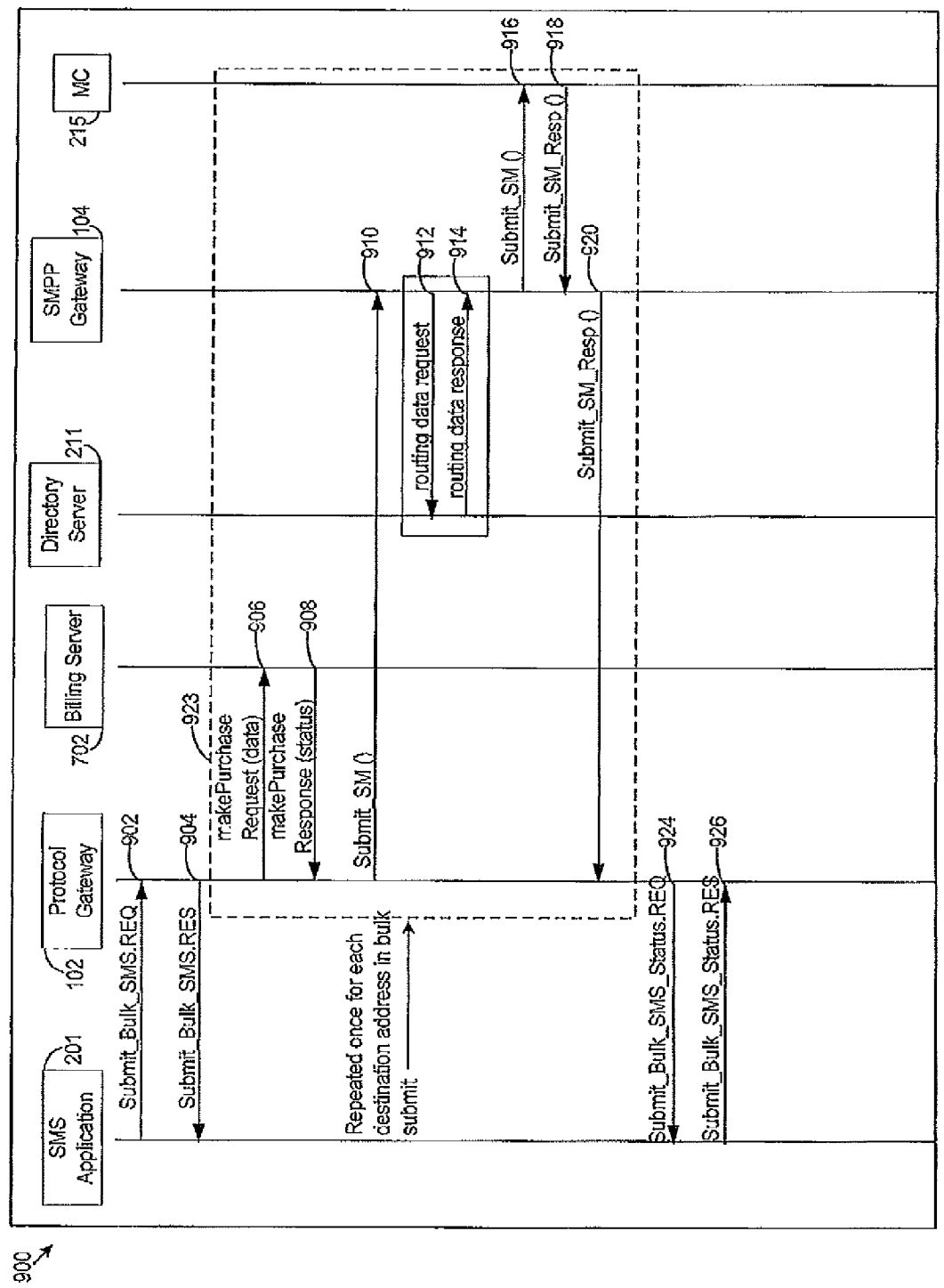
FIG. 9 is a diagram illustrating a method for a sending bulk message from within the second embodiment.

FIG. 9 is a diagram 900 illustrating a bulk send of a message with billing capability. At 902, the SMS application 201 sends a bulk message request in a SOAP format to the protocol gateway 102. This message is labeled "Submit_Bulk_SMS.REQ" on the diagram. At 904, the protocol gateway 102 sends a response to the bulk message request to the SMS application 201 confirming receipt of the bulk message request. The protocol gateway 102 can perform a conversion operation on the SOAP formatted message sent from the SMS application 201. The bulk message request can contain the message to be sent which is common to all intended recipients along with information identifying the intended recipients. The protocol gateway 102 can create SMPP formatted messages from the bulk message request for each of the intended recipients.

At 906, the protocol gateway 102 issues a purchase request to the billing server 702. The purchase request can include information that identifies one of the wireless subscriber accounts where the bulk message is to be sent. At 908, the billing server 702 returns a response to the purchase request to the protocol gateway 102. As mentioned above with respect to FIG. 8, the billing server 702 can perform a check to determine if the intended recipient can be billed for the message. If not, message delivery can be denied.

If the account associated with the intended recipient can be billed, at 910 the protocol gateway 102 submits the SMPP formatted message for the intended recipient to SMPP gateway 104. At 912, the SMPP gateway 104 sends a routing data request to the directory server 211. At step 914, the directory server 211 returns a routing data response to the SMPP gateway 104 indicating which message center the SMPP gateway 104 should send the request to for delivery. At step 916, the SMPP gateway 104 submits the send request to the message center 215 for delivery.

At 918, the message center 215 issues a response confirming that the message has been received at the message center 215. This is not a confirmation that the message has been delivered; only that it has been received at the message center 215. The confirmation response is sent from the message center 215 to the SMPP gateway 104. The SMPP gateway 104 forwards this response to the protocol gateway 102 at 920. The protocol gateway 102 records that one of the bulk messages was received at the message center 215. The destination address of the original message can be used to identify to which of the intended recipients that the confirmation message corresponds.

The actions at 906, 908, 910, 912, 914, 916, 918, and 920 enclosed in dotted line 923 are repeated for each destination address in the bulk send request.

At 924, the protocol gateway 102 sends a SOAP formatted message to the SMS application 201 to confirm that the plurality of messages corresponding to the initial bulk status request were received by their respective message centers 215. This message may indicate which, if any, delivery attempts were completed, and which resulted in failure. At 926, the SMS application 201 sends a response to the protocol gateway 102 to indicate that the confirmation was received.

Thus, the protocol gateway 102 allows the SMS application 201 to submit a single message and a list of destination addresses for delivery to each address. A destination address can be, for example, a mobile telephone number. The protocol gateway 102 submits a purchase request to a billing server 702 for each message recipient, and collects responses for each message from their respective message centers (whether successful or unsuccessful) and assembles them into a response, which can then be forwarded to the SMS application 201.

The SMS application 201 of the protocol gateway network architecture 100 and the protocol gateway network architecture 700 can communicate with the protocol gateway 102 using a SOAP format which is transported by, for example, a Hypertext Transfer Protocol (HTTP). Data transport between the SMS application 201 and the protocol gateway 102 can occur using a secured authentication of the SMS application 201 and data encryption. The SOAP message being exchanged by the protocol gateway 102 and the SMS application 201 can include a header, a body, and mime attachments.

The communications between an SMS application 201 and a protocol gateway 102 can comprise a number of message types. These messages contain headers that indicate the message type along with other logical parameters. Along with the headers, the messages include body information that contains the data elements relevant to each of the message types.

A typical header can include, for example, elements corresponding to a transaction ID, message type, protocol version and service provider ID. The transaction ID can be a unique identifier used for a set of messages corresponding to a request to send an SMS message and any related messages such as confirmation messages.

The message type can indicate what type of message to which the body information corresponds. Examples can include, Submit_SMS.REQ (for submitting a new request from an SMS application 201 to the protocol gateway 102 for sending an SMS message), Submit_SMS.RES (for the protocol gateway 102 sending a response to a request from a SMS application 201), Deliver_SMS.REQ (for sending a message center 215 receipt confirmation from the protocol gateway 102 to an SMS application 201), Deliver_SMS.RES (for an SMS application 201 to respond to the protocol gateway 102 that a message center 215 receipt confirmation was received), Delivery_Report.REQ (for sending a delivery report from the protocol gateway 102 to an SMS application 201) Delivery_Report.RES (for sending a response from an SMS application 201 to the protocol gateway 102 to indicate that a delivery report was received), Submit_Bulk_SMS.REQ (for submitting a bulk send request from an SMS application 201 to the protocol gateway 102), Submit_Bulk_SMS.RES (for the protocol gateway 102 to respond to the SMS application 201 indicating that a bulk send request was received), Submit_Bulk_SMS_Status.REQ (for the protocol gateway 102 to send to the SMS application 201 to indicate that a bulk message send was completed), Submit_Bulk_SMS_Status.RES (for an SMS application 201 to acknowledge receipt of a bulk send complete message), Number_Validity.REQ (for submitting a number validity check request from an SMS application 201 to the protocol gateway 102), Number_Validity.RES for the protocol gateway 102 to indicate that a number validity check request was received), Number_Validity_Status.REQ (for the protocol gateway 102 to return the results of a number validity check to an SMS application 201, and Number_Validity_Status.RES (for an SMS application 201 to confirm receipt of the results of a number validity check).

Body information can be specific to each message type. For example, the body elements of a Submit_SMS.REQ can include: source address, destination address, delivery report requested, mobile terminated charging, charging information, and reference to MIME attachments. The source address can be the IP address of the SMS application 201 that is requesting that a message be sent. This may or may not include the port number at which the SMS application 201 can be reached. The destination address can be the mobile telephone number of the device intended to receive the message being submitted. Delivery report request can be a logical field ('1' or '0' or text 'yes' or 'no') that indicates whether or not the SMS application 201 requests a delivery report for the message. Mobile terminated charging can be a logical field that indicates whether or not the mobile recipient is to be charged for the message content. Charging information can include an identification of the product that is being delivered (for example, the name of a purchased telephone background photo), quantity purchased, description, etc. Reference to MIME attachment can include information that points to content to be attached to a message to the mobile recipient.

Body fields for a Submit_SMS.RES message can include request status, error code, message ID, and charging results information. The request status field can indicate the status of the message submission corresponding to this response. Error code can contain information regarding any error codes that are associated with the message delivery attempt. Message ID can include information that identifies the message to which this response corresponds. Charging results information can include the status of the purchase, a status message, quantity purchased, description, etc.

By providing a protocol gateway between a SMS application 201 and a SMPP gateway 104, a simplified interface is provided for communicating messages. Thus, SMS applications 201 are not required to maintain any knowledge of the SMPP protocol, which is a protocol that is less well known than SOAP, more difficult to work with, and can require specific knowledge of a wireless network.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

The invention claimed is:

1. A method comprising:
    receiving, by a gateway comprising a processor, from a short-message-service application, a validity request to verify whether each of a plurality of addresses is a valid number within a wireless network and whether each of the plurality of addresses is assigned to a wireless service, the validity request formatted in a first protocol, the validity request comprising the plurality of addresses;
    converting, by the gateway, the validity request into a plurality of queries, each of the plurality of queries formatted according to a second protocol and each of the plurality of queries associated with a respective one of the plurality of addresses of the validity request;
    sending, by the gateway, in a sending function, a query of the plurality of queries to a resolution server to verify whether an address of the plurality of addresses associated with the query of the plurality of queries is a valid number within the wireless network and whether the address is assigned to the wireless service;
    receiving, by the gateway, from the resolution server, in a receiving function, a response to the query, the response formatted according to the second protocol;
    repeating, by the gateway, in connection with each remaining query of the plurality of queries, the sending function and the receiving function;
    assembling, by the gateway, each response received from the resolution server in the receiving function to create a composite response formatted according to the first protocol, the composite response comprising verifications as to whether each of the plurality of addresses is a valid number within the wireless network and whether each of the plurality of addresses is assigned to the wireless service;
    sending, by the gateway, to the short-message-service application, the composite response;
    receiving, by the gateway, from the short-message-service application, a bulk short-message-service send request comprising a list of the plurality of addresses and message content common to all of the plurality of addresses, the bulk short-message-service send request formatted in the first protocol; and
    converting, by the gateway, the bulk short-message-service send request into a plurality of send requests formatted in a third protocol, each of the plurality of send requests associated with a respective one of the plurality of addresses of the bulk short-message-service send request and each of the plurality of send requests comprising the message content, wherein the first protocol, the second protocol, and the third protocol are different from one another.

2. The method of claim 1, wherein the first protocol is a simple object access protocol and the second protocol is a lightweight directory access protocol.

3. The method of claim 1, wherein the first protocol is a simple object access protocol, the second protocol is a lightweight directory access protocol, and the third protocol is a short message peer-to-peer protocol.

4. The method of claim 1, wherein the gateway is a first gateway, and wherein the method further comprises sending, by the first gateway, each of the plurality of send requests to a second gateway for delivery to a respective one of the plurality of addresses.

5. The method of claim 4, further comprising:
    receiving, by the first gateway, delivery responses confirming that the plurality of send requests have been sent to the plurality of addresses;
    assembling the delivery responses into an assembled response;
    converting the assembled response to the first protocol; and
    sending the assembled response to the short-message-service application.

6. The method of claim 1, further comprising sending, by the gateway, in response to receiving, at the gateway, the bulk short-message-service send request comprising the list of the plurality of addresses, a purchase request to a billing server to bill a subscriber corresponding to one of the plurality of addresses for the message content.

7. The method of claim 6, wherein the purchase request comprises at least one piece of data selected from a group consisting of:
    a type of the message content; and
    a price of the message content.

8. A gateway comprising:
    a processor; and
    a memory that stores instructions that, when executed by the processor, cause the processor to perform operations comprising
        receiving, from a short-message-service application, a validity request to verify whether each of a plurality of addresses is a valid number within a wireless network and whether each of the plurality of addresses is assigned to a wireless service, the validity request formatted in a first protocol, the validity request comprising the plurality of addresses, converting the validity request into a plurality of queries, each of the plurality of queries formatted according to a second protocol and each of the plurality of queries associated with a respective one of the plurality of addresses of the validity request, sending, in a sending function, a query of the plurality of queries to a resolution server to verify whether an address of the plurality of addresses associated with the query of the plurality of queries is a valid number within the wireless network and whether the address is assigned to the wireless service, receiving, from the resolution server, in a receiving function, a response to the query, the response formatted according to the second protocol, repeating, in connection with each remaining query of the plurality of queries, the sending function and the receiving function, assembling each response received from the resolution server in the receiving function to create a composite response formatted according to the first protocol, the composite response comprising verifications as to whether each of the plurality of addresses is a valid number within the wireless network and whether each of the plurality of addresses is assigned to the wireless service, sending, to the short-message-service application, the composite response, receiving, from the short-message-service application, a bulk short-message-service send request comprising a list of the plurality of addresses and message content common to all of the plurality of addresses, the bulk short-message-service send request formatted in the first protocol; and converting the bulk short-message-service send request into a plurality of send requests formatted in a third protocol, each of the plurality of send requests associated with a respective one of the plurality of addresses of the bulk short-message-service send request and each of the plurality of send requests comprising the message content, wherein the first protocol, the second protocol, and the third protocol are different from one another.

9. The gateway of claim 8, wherein the first protocol is a simple object access protocol and the second protocol is a lightweight directory access protocol.

10. The gateway of claim 8, wherein the first protocol is a simple object access protocol, the second protocol is a lightweight directory access protocol, and the third protocol is a short message peer-to-peer protocol.

11. The gateway of claim 8, wherein the gateway is a first gateway, and wherein the operations further comprise sending each of the plurality of send requests to a second gateway for delivery to a respective one of the plurality of addresses.

12. The gateway of claim 11, wherein the operations further comprise:
receiving delivery responses confirming that the plurality of send requests have been sent to the plurality of addresses;
assembling the delivery responses into an assembled response;
converting the assembled response to the first protocol; and
sending the assembled response to the short-message-service application.

13. The gateway of claim 8, wherein the operations further comprise sending, in response to receiving the bulk short-message-service send request comprising the list of the plurality of addresses, a purchase request to a billing server to bill a subscriber corresponding to one of the plurality of addresses for the message content.

14. The gateway of claim 13, wherein the purchase request comprises at least one piece of data selected from a group consisting of:
a type of the message content; and
a price of the message content.

* * * * *